United States Patent
Hayashi et al.

(10) Patent No.: US 11,214,255 B2
(45) Date of Patent: Jan. 4, 2022

(54) VEHICLE CONTROL DEVICE AND VEHICLE CONTROL METHOD

(71) Applicant: ISUZU MOTORS LIMITED, Tokyo (JP)

(72) Inventors: Satoshi Hayashi, Fujisawa (JP); Naoki Takahashi, Fujisawa (JP); Shinichi Ishiguro, Fujisawa (JP); Kouki Natsumi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/982,498

(22) PCT Filed: Mar. 15, 2019

(86) PCT No.: PCT/JP2019/010841
§ 371 (c)(1),
(2) Date: Sep. 18, 2020

(87) PCT Pub. No.: WO2019/181785
PCT Pub. Date: Sep. 26, 2019

(65) Prior Publication Data
US 2021/0016775 A1 Jan. 21, 2021

(30) Foreign Application Priority Data
Mar. 19, 2018 (JP) .............................. JP2018-051094

(51) Int. Cl.
*B60W 30/18* (2012.01)
*B60W 10/06* (2006.01)
(Continued)

(52) U.S. Cl.
CPC ...... *B60W 30/18072* (2013.01); *B60W 10/06* (2013.01); *B60W 10/10* (2013.01);
(Continued)

(58) Field of Classification Search
CPC ................. B60W 10/06; B60W 10/10; B60W 30/18072; B60W 2030/18081;
(Continued)

(56) References Cited

U.S. PATENT DOCUMENTS 4,884,667 A * 12/1989 Koga ........................ F16H 3/12
192/3.55
2006/0293824 A1 12/2006 Steen et al.
(Continued)

FOREIGN PATENT DOCUMENTS

CN 1930412 A 3/2007
CN 104487299 A 4/2015
(Continued)

OTHER PUBLICATIONS

International Search Report and Written Opinion for related JP. App. No. PCT/JP2019/010841 dated Jun. 11, 2019. English abstract provided; 7 pages.
(Continued)

*Primary Examiner* — Edwin A Young
(74) *Attorney, Agent, or Firm* — Procopio, Cory, Hargreaves & Savitch LLP

(57) ABSTRACT

A vehicle control device comprising: a balance gradient calculation unit configured to calculate a balance gradient that is a gradient at which a propulsive force of the vehicle and a resistance force applied to the vehicle are balanced when the vehicle travels in a gear-in coasting state in which an engine is connected to a gear and the vehicle travels without supplying fuel to the engine, in a case where a traveling state of the vehicle is a neutral coasting state; and a traveling control unit configured to: switch, based on the calculated balance gradient and a specified road gradient, the traveling state of the vehicle from the neutral coasting state to the gear-in coasting state in a case where the traveling
(Continued)

state of the vehicle is the neutral coasting state; and end, the gear-in coasting state when determining that an end condition is satisfied.

5 Claims, 4 Drawing Sheets

(51) Int. Cl.
  *B60W 10/10*   (2012.01)
  *B60W 40/06*   (2012.01)
  *F16H 59/44*   (2006.01)
  *F16H 59/66*   (2006.01)
  *F16H 59/68*   (2006.01)
  *F16H 61/21*   (2006.01)
  *F16H 61/68*   (2006.01)
(52) U.S. Cl.
  CPC ............ *B60W 40/06* (2013.01); *F16H 59/44* (2013.01); *F16H 59/66* (2013.01); *F16H 59/68* (2013.01); *F16H 61/21* (2013.01); *F16H 61/68* (2013.01); *B60W 2510/06* (2013.01); *B60W 2510/101* (2013.01); *B60W 2520/105* (2013.01); *B60W 2552/15* (2020.02); *B60W 2710/1005* (2013.01); *F16H 2059/663* (2013.01); *F16H 2059/6823* (2013.01)
(58) Field of Classification Search
  CPC ......... B60W 2030/1809; B60W 40/06; B60W 40/076; B60W 2552/15; B60W 2510/06; B60W 2510/101; B60W 2520/105; B60W 2710/1005; F16H 59/44; F16H 59/66; F16H 59/68; F16H 2059/663; F16H 205/6823; F16H 61/21; F16H 61/68
  See application file for complete search history.

(56) References Cited

U.S. PATENT DOCUMENTS

| | | | |
|---|---|---|---|
| 2015/0166064 A1* | 6/2015 | Mitsuyasu | B60W 10/10 701/54 |
| 2015/0166065 A1 | 6/2015 | Kuroki et al. | |
| 2015/0166066 A1* | 6/2015 | Suzuki | B60W 10/02 477/174 |
| 2016/0327150 A1 | 11/2016 | Lee et al. | |
| 2018/0111615 A1 | 4/2018 | Yamakado et al. | |

FOREIGN PATENT DOCUMENTS

| | | |
|---|---|---|
| CN | 107035858 A | 8/2017 |
| JP | 2012219904 A | 11/2012 |
| JP | 2015051646 A | 3/2015 |
| JP | 2016182935 A | 10/2016 |

OTHER PUBLICATIONS

First Office Action for related CN App No. 201980020376.X dated Apr. 30, 2021, 13 pgs.

* cited by examiner

VEHICLE CONTROL DEVICE AND VEHICLE CONTROL METHOD

CROSS-REFERENCE TO RELATED APPLICATIONS

This application is a U.S. National Stage entry of PCT Application No. PCT/JP2019/010841, filed on Mar. 15, 2019, which claims priority to JP Application No. 2018-051094, filed Mar. 19, 2018. The contents of the foregoing are incorporated by reference.

TECHNICAL FIELD

The present disclosure relates to a vehicle control device and a vehicle control method.

BACKGROUND ART

In related art, fuel efficiency is improved by specifying a road gradient indicating a gradient of a road on which a vehicle travels and controlling the traveling of the vehicle based on the road gradient. For example, Patent Literature 1 discloses a control device that causes a vehicle to travel in a neutral coasting state that is a state where the vehicle travels without connecting an engine to a g n based on a road gradient of a road on which the vehicle travels.

CITATION LIST

Patent Literature

Patent Literature 1: JP-A-2016-1P935

SUMMARY OF INVENTION

Technical Problem

In neutral coasting, a braking force of the vehicle is low. Therefore, when the vehicle travels in the neutral coasting state on a downhill road, a speed of the vehicle may tend to increase, and a feeling of a driver with respect to traveling control may deteriorate.

Therefore, the present disclosure has been made in view of these points, and an object thereof is to provide a vehicle control device that can improve a feeling of a driver with respect to traveling control.

Solution to Problem

A vehicle control device according to a first aspect of the present disclosure includes: a road gradient specifying unit configured to specify a road gradient of a section from a position of a vehicle to a position ahead by a predetermined distance from the position of the vehicle on a road on which the vehicle travels; a balance gradient calculation unit configured to calculate a balance gradient that is a gradient at which a propulsive force of the vehicle and a resistance force applied to the vehicle are balanced when the vehicle travels in a gear-in coasting state in which an engine is connected to a gear and the vehicle travels without supplying fuel to the engine, the balance gradient being calculated in a case where a traveling state of the vehicle is a neutral coasting state that is a state of traveling without connecting the engine to the gear; and a traveling control unit configured to: switch, based on the calculated balance gradient and the specified road gradient, the traveling state of the vehicle from the neutral coasting state to the gear-in coasting state in a case where the traveling state of the vehicle is the neutral coasting state; determine whether an end condition of the gear-in coasting state is satisfied after a predetermined time has elapsed since the traveling state of the vehicle is switched to the coasting state; and end the gear-in coasting state when determining that the end condition is satisfied.

The traveling control unit, may be configured to determine whether the vehicle is decelerating at a predetermined time interval in a case where the traveling state of the vehicle is the gear-in coasting state, and may end the gear-in coasting state when determining that the vehicle is decelerating for a predetermined continuous number of times.

The traveling control unit may determine, based on the balance gradient and the road gradient, whether to switch the traveling state of the vehicle to the gear-in coasting state at a time interval shorter than the predetermined time interval in a case where the traveling state of the vehicle is the neutral coasting state, and may switch the traveling state of the vehicle from the neutral coasting state to the gear-in coasting state when determining to switch the traveling state of the vehicle to the gear-in coasting state.

A vehicle control method according tea a second aspect of the present disclosure is executed by a computer, and the vehicle control method includes: a step of specifying a road gradient of a section from a position of a vehicle to a position ahead by a predetermined distance from the position of the vehicle on a road on which the vehicle travels; a step of calculating a line balance gradient that is a gradient at which a propulsive force of the vehicle and a resistance force applied to the vehicle are balanced when the vehicle travels in a gear-in coasting state in which an engine is connected to a gear and the vehicle travels without supplying fuel to the engine, the balance gradient being calculated in a case where a traveling state of the vehicle is a neutral coasting state that is a state of traveling without connecting the engine to the gear; and a step of; switching, based on the calculated balance gradient and the specified road gradient, the traveling state of the vehicle from the neutral coasting state to the gear-in coasting state in a case where the traveling state of the vehicle is the neutral coasting state; determining whether an end condition of the gear-in coasting state is satisfied after a predetermined time has elapsed since the traveling state of the vehicle is switched to the gear-in coasting state; and ending the gear-in coasting state when determining that the end condition is satisfied.

Advantageous Effects of Invention

According to the present disclosure, the feeling of the driver with respect to the traveling control can be improved.

DESCRIPTION OF EMBODIMENTS

Figure 1:
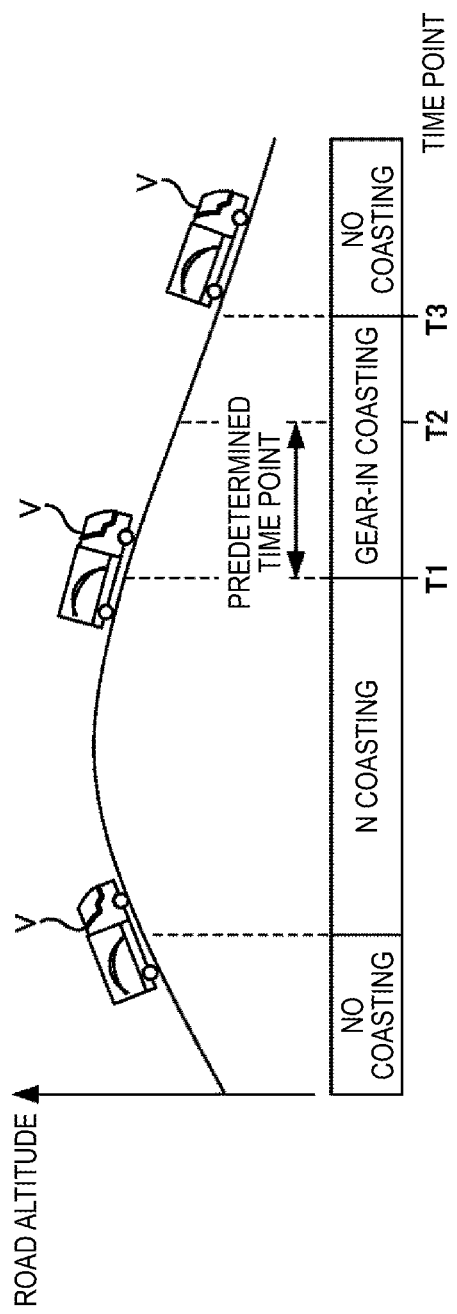
FIG. 1 is a diagram showing an outline of a vehicle according to the present embodiment.

FIG. 1 is a diagram showing an outline of a vehicle V according to the present embodiment.

The vehicle V is a vehicle that can travel in an auto cruise mode in which the vehicle travels so as to maintain a preset speed of the vehicle V even when a driver does not operate an accelerator or a shift lever.

In a case of traveling in the auto cruise mode, the vehicle V can travel in a neutral coasting state and a gear-in coasting state in addition to a traveling state where the vehicle travels by supplying fuel to an engine. The neutral coasting state is a state in which the vehicle travels without connecting the engine to a gear. The gear-in coasting state is a slate in which an engine is connected to a gear and the vehicle travels without supplying fuel to the engine. In the following description, the neutral coasting slate is also referred to as an N coasting state. Further, a traveling state where the vehicle travels by supplying fuel to the engine is also referred to as a no-coasting state.

The vehicle V specifies a road gradient of a road on which the vehicle V itself is traveling. In a case where the vehicle V is traveling in the N coasting state, the vehicle V determines whether the vehicle V does not decelerate even if the switching the traveling state is switched from the N coasting state to the gear-in coasting state based on the road gradient. When determining that the vehicle V does not decelerate even if the traveling, state is switched from the N coasting state to the coasting state, the vehicle V switches the traveling state of the vehicle V from the N coasting state to the gear-in coasting state (time point T1 in FIG. 1).

When the vehicle V travels on a downhill road in the N coasting state, the speed of the vehicle V tends to increase, which may give the driver a fear. In the gear-in coasting state, an engine brake is applied because the engine and the gear are connected, and the speed does not tend to increase as compared with the speed in the N coasting state. Therefore, the vehicle V travels by switching the traveling state from the N coasting state to the gear-in coasting state, so that a speed increase when traveling on the downhill road can be lowered so as to improve a feeling of the driver.

As shown in FIG. 1, the vehicle V determines, as needed, whether the vehicle V is decelerating alter a time point T2 at which a predetermined time has elapsed alter the traveling state is switched to the gear-in coasting state. When determining that the vehicle V itself is decelerating, the vehicle V ends the gear-in coasting state (a time point T3 in FIG. 1). Since the vehicle V determines whether the vehicle V is decelerating after a predetermined time has elapsed since the traveling state is switched to the gear-in coasting state, the vehicle V can travel in the gear-in coasting state for the predetermined time. Accordingly, the vehicle V can prevent the gear-in coasting state front being ended early within the predetermined time after the traveling state is switched to the gear-in coasting state so as not to give a sense of discomfort to the driver. Therefore, the vehicle V can improve the feeling of the driver with respect to traveling control. Hereinafter, the vehicle V will be described in detail.

[Configuration of Vehicle V]

Figure 2:
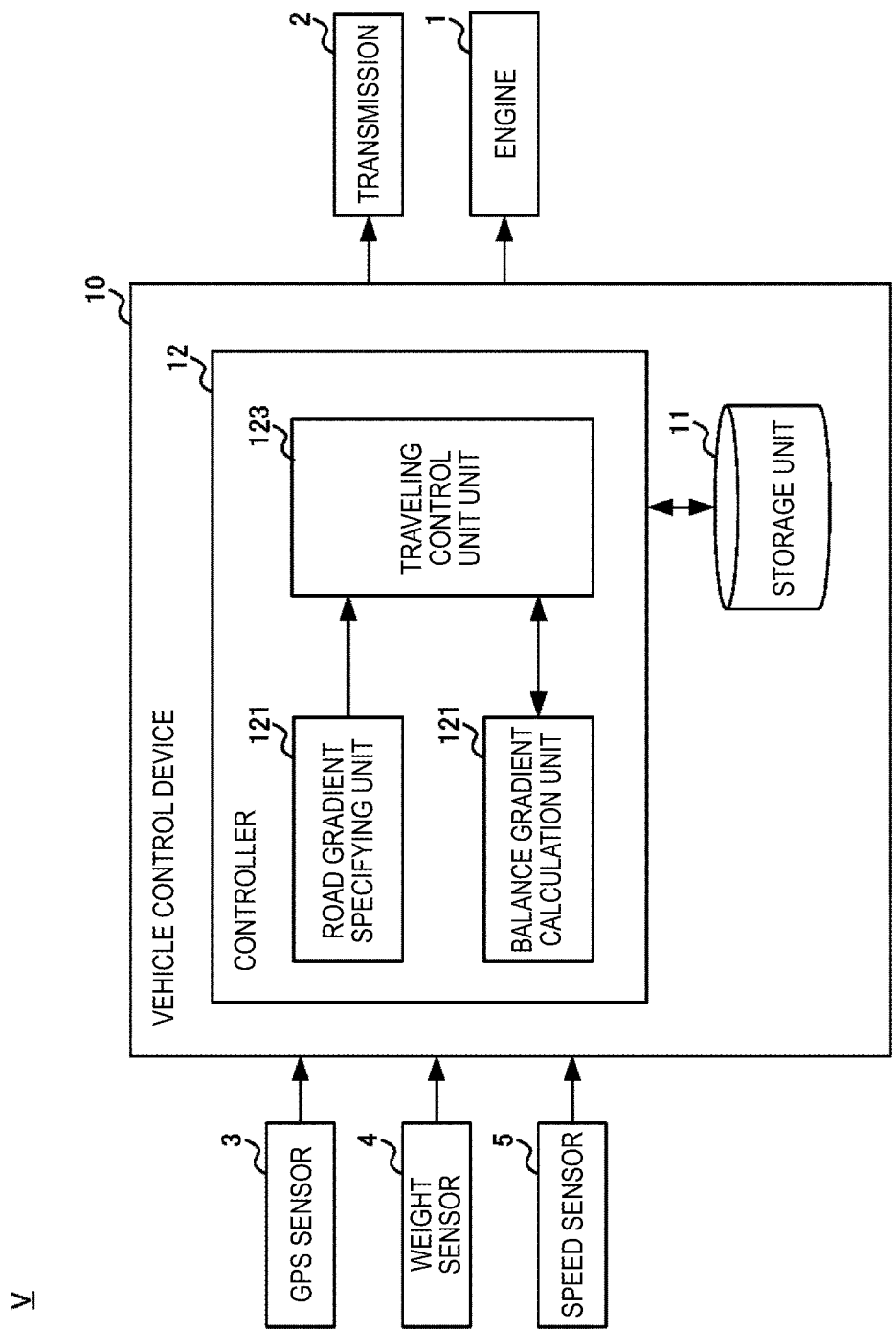
FIG. 2 is a diagram schematically showing an internal configuration of the vehicle according to the present embodiment.

FIG. 2 is a diagram schematically showing an internal configuration of the vehicle V according to the present embodiment. The vehicle V includes an engine 1, a transmission 2, a Global Positioning System (GPS) sensor 3, a weight sensor 4, a speed sensor 5, and a vehicle control device 10 (e.g, an electronic control unit (ECU)).

The vehicle V is a large vehicle that uses the engine 1 such as a diesel engine as a driving force, and is a vehicle having the auto cruise mode as described above. The transmission 2 transmits a rotational driving force of the engine to driven wheels (not shown) of the vehicle V. The transmission 2 includes a plurality of stages of gears for converting the rotational driving force of the engine 1.

The GPS sensor 3 receives and analyzes radio waves transmitted from a plurality of navigation satellites, thereby acquiring a position of the GPS sensor 3, that is, a position of the vehicle V on which the GPS sensor 3 is mounted. The GPS sensor 3 outputs information indicating the position of the vehicle V to the vehicle control device 10.

The weight sensor 4 acquires a total weight of the vehicle V. Specifically, the weight sensor 4 measures a weight of a load of the vehicle V, and sums the weight of the load of the vehicle V with a weight of the vehicle V alone excluding the load so as to acquire the total weight of the vehicle V. The weight sensor 4 outputs information indicating the total weight of the vehicle V to the vehicle control device 10.

The speed sensor 5 measures the speed of the vehicle V. The speed sensor 5 outputs information indicating the measured speed to the vehicle control device 10.

The vehicle control device 10 acquires information from the sensors and controls the traveling state of the vehicle V based on the acquired information. In a case where the vehicle V travels in the auto cruise mode, the vehicle control device 10 controls the engine 1 and the transmission 2 such that the vehicle V travels while maintaining a set speed and fuel efficiency of the vehicle V is improved.

[Configuration of Vehicle Control Device 10]

Next, a configuration of the vehicle control device 10 will be described with reference to FIG. 2. As shown in FIG. 2, the vehicle control device 10 includes a storage unit 11 and a controller 12.

The storage unit 11 is, for example, a Read Only Memory (ROM) or a Random Access Memory (RAM). The storage unit 11 stores various programs for causing the controller 12 to function.

The controller 12 is a calculation resource including a processor such as a Central Processing Unit (CPU), not shown. The controller 12 executes the programs stored in the storage unit 11, thereby implementing functions of a road gradient specifying unit 121, a balance gradient calculation unit 122, and a traveling control unit 123.

The road gradient specifying unit 121 specifies a road gradient of a forward traveling section that is a section from the position of the vehicle V to a position ahead by a predetermined distance (for example, 500 m) from the position of the vehicle V on a road on which the vehicle V travels. Specifically, the road gradient specifying unit 121 specifies the road gradient of the forward traveling section based on information indicating the position of the vehicle V acquired from the GPS sensor 3 and map information stored in the storage unit 11. The road gradient specifying unit 121 specifies respective road gradients of a plurality of positions included in the forward traveling section.

In a ease where the traveling state of the vehicle V is the N coasting state, the balance gradient calculation unit 122 calculates a gear-in coasting balance gradient that is a gradient at which a propulsive force of the vehicle V and a resistance force applied to the vehicle V are balanced when the vehicle V travels in the gear-in coasting state.

Specifically, first, the balance gradient calculation unit 122 specifies a current rotation speed of the engine 1. First, the balance gradient calculation unit 122 refers to engine characteristic map information indicating a relationship between the engine rotation speed and an engine torque stored in the storage unit 11 and specifies a torque corresponding to the specified rotation speed of the engine 1. Then, the balance gradient calculation unit 122 calculates an engine braking force based on the specified torque, a tire radius of the vehicle V. and transmission efficiency and a gear ratio of each gear.

When the specified torque is defined as $T_f$, the tire radius is defined as $R_{tire}$, a transmission efficiency of the current gear is defined as $\eta_{Trans}$, a gear ratio of the current gear is defined as $\gamma_{Trans}$, transmission efficiency of a differential gear is defined as $\eta_{final}$, a gear ratio of the differential gear is defined as $\gamma_{final}$, and the engine braking force is defined as $F_f$, the engine braking force $F_f$ is calculated by the following equation (1).

$$F_f = \frac{T_f}{R_{tire}} \cdot \left(\frac{\gamma_{Trans}}{\eta_{Trans}}\right) \cdot \left(\frac{\gamma_{final}}{\eta_{final}}\right) \qquad (1)$$

Next, the balance gradient calculation unit 122 acquires the total weight of the vehicle V output from the weight sensor 4, and also acquires an air resistance coefficient, a rolling resistance coefficient, and gravitational acceleration that are stored in advance in the storage unit 11. The balance gradient calculation unit 122 calculates the gear-in coasting balance gradient based on the calculated engine braking force and the acquired information.

When the gear-in coasting balance gradient is defined as the engine braking force is defined as $F_f$, the weight of the vehicle V is defined as M, the rolling resistance coefficient is defined as μ the air resistance coefficient I defined as λ, the gravitational acceleration is defined as g, and the gear-in coasting balance gradient is defined as $\theta_{engbrk}$, the gear-in coasting balance gradient $\theta_{engbrk}$ is calculated by the following equation (2).

$$\theta_{engbrk} = \sin^{-1}\left\{-\left(\frac{\lambda \cdot V^2}{M} + \frac{F_f}{Mg}\right)\right\} - \sin^{-1}\left(\frac{\mu}{\sqrt{1+\mu^2}}\right) \qquad (2)$$

The traveling control unit 123 controls the traveling state of the vehicle V based on the road gradient specified by the road gradient specifying unit 121. Specifically, in a case where the vehicle V is in the no-coasting state, the traveling control unit 123 determines whether the specified road gradient satisfies a start condition of the N coasting state. The start condition of the N coasting state is that, for example, the speed of the vehicle V does not tall below a lower limit speed, which is a lower limit of a speed set in the auto cruise mode, in the forward traveling section in case where the vehicle V is traveling in the N coasting state. When determining that the start condition of the N coasting state is satisfied, the traveling control unit 123 controls the engine 1 and the transmission 2 so as to switch the traveling state of the vehicle V to the N coasting state.

In a case where the traveling state of the vehicle V is the N coasting state, the traveling control unit 123 determines whether to switch the traveling state of the vehicle. V from the N coasting state to the gear-in coasting state based on the calculated gear-in coasting balance gradient and the specified road gradient. For example, the traveling control unit 23 determines whether to switch to the gear-in coasting state by determining whether a maximum value of the specified road gradient is smaller than the gear-in roasting balance gradient at a first time interval (for example, 50 milliseconds).

When determining to switch to the gear-in coasting state, the traveling control unit 123 controls the engine 1 and the transmission 2 so as to switch the traveling state of the vehicle V from the N coasting state to the gear-in coasting state.

After a predetermined time (for example, 5 seconds) has elapsed since the traveling state of the vehicle V has been switched to the gear-in coasting state, the traveling control unit 123 determines whether an end condition of the gear-in coasting state is satisfied. When determining that the end condition is satisfied, the traveling control unit 123 ends the gear-in coasting state.

For example, based on the speed of the vehicle V acquired by the speed sensor 5, the traveling control unit 123 determines whether the vehicle V is decelerating at a first time interval (for example, an interval of 200 milliseconds). When determining that the vehicle V is decelerating for a predetermined continuous number of limes (for example, 5 times), the traveling control unit 123 determines to end the gear-in coasting state. Accordingly, the vehicle control device 10 can determine to end the gear-in coasting slate in a case where the vehicle V is decelerating reliably. When determining that the speed of the vehicle V acquired by the speed sensor 5 exceeds an upper limit speed that is an upper limit of a speed set in the auto cruise mode, the traveling control unit 123 determines to end the gear-in coasting state.

When determining to end the gear-in coasting slate, the traveling control unit 123 supplies fuel to the engine 1 so as to end the gear-in coasting state, and operates an auxiliary brake (not shown) provided in the vehicle V so as to switch the traveling state of the vehicle V to the no-coasting state.

[Flow of Processing After Switching to N Coasting Slate]

Figure 3:
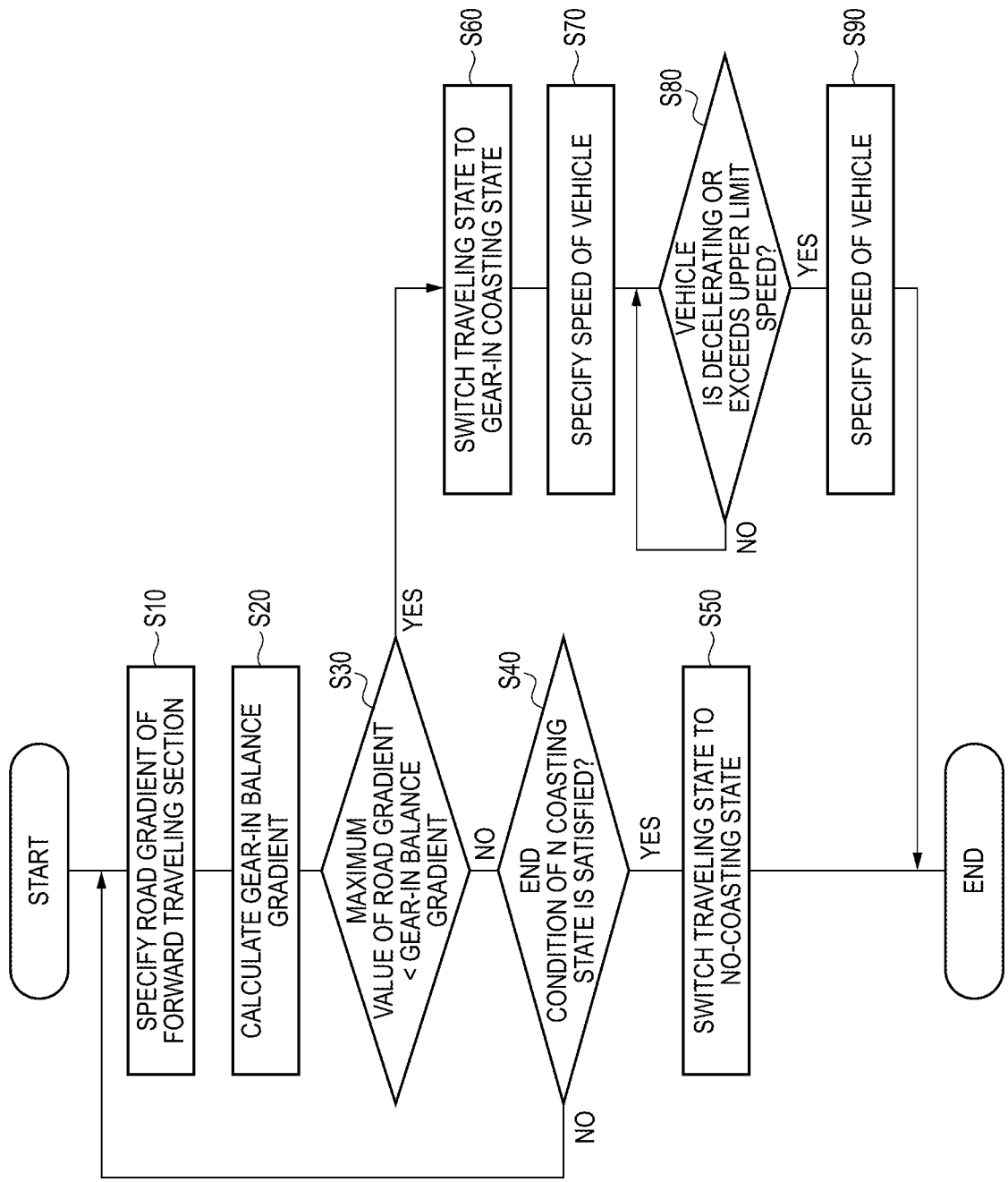
FIG. 3 is a flowchart showing a flow of a processing of a vehicle control device after a traveling state of the vehicle according to the present embodiment has been switched to an N coasting state.

Next, a flow of a processing of the vehicle control device 10 after the traveling state of the vehicle V is switched to the N coasting state w ill be described. FIG. 3 is a flowchart showing the flow of the processing of the vehicle control device 10 after five traveling slate of the vehicle V according to the present embodiment is switched to the N coasting state.

First, the road gradient specifying unit 121 specifies a road gradient of a forward traveling section on a road on which the vehicle V travels (S10).

Next, the balance gradient calculation unit 122 calculates a gear-in coasting balance gradient when the vehicle V travels in the forward traveling section (S20).

Next, the traveling control unit 123 determines whether a maximum value of the road gradient is smaller titan the gear-in coasting balance gradient (S30). When determining that the maximum value of the road gradient is smaller than the gear-in coasting balance gradient, the traveling control unit 123 shifts the processing to S60. When determining that the maximum value of the road gradient is equal to or larger than the gear-in coasting balance gradient, the traveling control unit 123 shifts the processing to S40.

In S40, the traveling control unit 123 determines whether an end condition of the N coasting state different from S30 is satisfied. The end condition of the N coasting state different from S30 is, for example, that the vehicle V is decelerating in a case where the vehicle V travels in the forward traveling section in the N coasting state. When determining that the end condition of the N coasting state is satisfied, the traveling control unit 123 shifts the processing to S50, switches the traveling state of the vehicle V to the no-coasting state, and ends the processing according to this flowchart. When determining that the end condition of the N coasting state is not satisfied, the traveling control unit 123 shifts the processing to S10.

In S60, the traveling control unit 123 switches the traveling slate of the vehicle V to the gear-in coasting state.

Thereafter, the traveling control unit 123 specifies a speed of the vehicle V (S70).

Next, the traveling control unit 123 determines, based on the speed of the vehicle V, whether the vehicle V is decelerating or exceeding an upper limit speed (S80). When determining that the speed of the vehicle V is decreasing or exceeding the upper limit speed, the traveling control unit 123 shifts the processing to S90. When determining that the speed of the vehicle V is not decreasing and the upper limit speed is also not exceeded, the traveling control unit 123 executes S80 again.

In S90, the traveling control unit 123 supplies fuel to the engine 1 so as to end the gear-in coasting state, and operates the auxiliary brake provided in the vehicle V so as to switch the traveling state of the vehicle V to the no-coasting state.

Comparative Example

Figure 4:
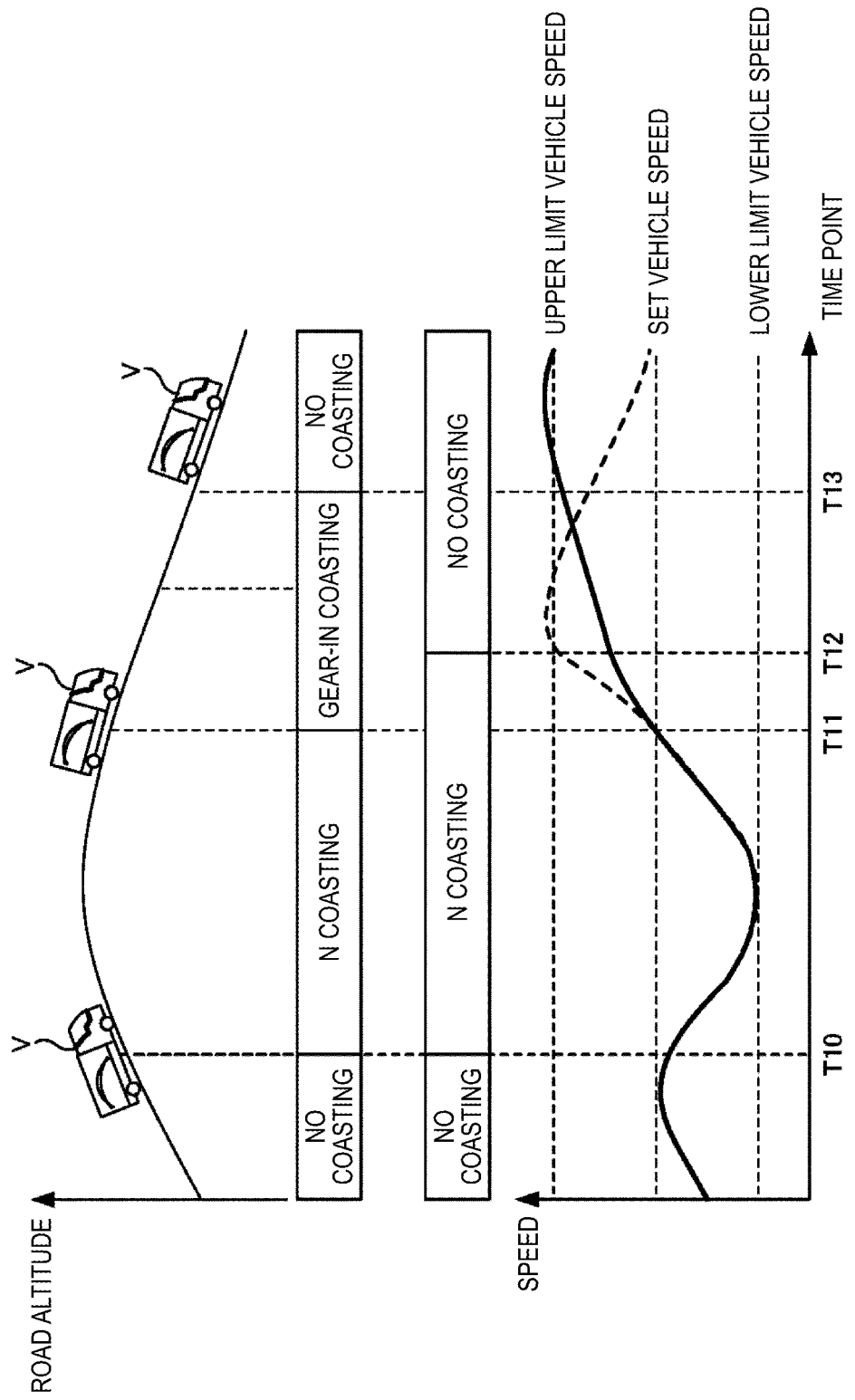
FIG. 4 is a diagram showing a comparative example of vehicle control by a vehicle control device in related art and vehicle control by the vehicle control device according to the present embodiment.

Next, a comparative example of vehicle control by a related-art vehicle control device that does not perform gear-in coasting and the vehicle control by the vehicle control device 10 according to the present embodiment will be shown. FIG. 4 is a diagram showing the comparative example of the vehicle control by the related-art vehicle control device and the vehicle control by the vehicle control device 10 according to the present embodiment.

FIG. 4 shows traveling states of the vehicle V when the vehicle is caused to travel the same position on the same road and speeds of the vehicle V at each time point, in a case where the related-art vehicle control device is mounted on the vehicle V and in a case where the vehicle control device 10 according to the present embodiment is mounted on the vehicle V. In FIG. 4, a speed indicated by a solid line is a speed of the vehicle V in a case where the vehicle control device 10 according to the present embodiment is mounted on the vehicle V. Further, in FIG. 4, a speed indicated by a broken line is a speed of the vehicle V in a case where the related-art vehicle control device is mounted on the vehicle V.

When the vehicle V approaches a downhill road, the related-art vehicle control device and the vehicle control device 10 according to the present embodiment switch the traveling state of the vehicle V to the N coasting state. In the example shown in FIG. 4, the related-art vehicle control device and the vehicle control device 10 according to the present embodiment switch the traveling state of the vehicle V to the N coasting slate at a time point 110.

The related-art vehicle control device does not switch the traveling state of the vehicle V to the gear-in coasting state after switching the traveling state of the vehicle V to the N coasting state. Therefore, the speed of the vehicle V significantly increases on the downhill road, and the speed of the vehicle V reaches an upper limit vehicle speed at a time point T12. Therefore, the related-art vehicle control device switches the traveling state of the vehicle V to the no-coasting state at the time point T12 so as to operate the auxiliary brake.

On the other hand, the vehicle control device 10 according to the present embodiment switches the traveling state of the vehicle V to the gear-in coasting state at a time point 111 earlier than the time point T12 based on a road gradient of a forward traveling section, after switching the traveling stale of the vehicle V to the N coasting state. Accordingly, the speed of the vehicle V on the downhill road slowly increases as compared with a case of traveling in the N coasting state. Then, the speed of the vehicle V reaches the upper limit vehicle speed at a time point T13. Therefore, the vehicle control device 10 according to the present embodiment switches the traveling state of the vehicle V to the no-coasting state at the time point T13 later than the time point T12.

Accordingly, since the vehicle control device 10 according to the present embodiment can continue a stale of not consuming fuel until the lime point T13, fuel efficiency can be improved.

Effects of Present Embodiment

As described above, in a case where the traveling state of the vehicle V is the N coasting state, the vehicle control device 10 according to the present embodiment switches the traveling state of the vehicle V from the N coasting state to the gear-in coasting state based on the calculated gear-in coasting balance gradient and the specified road gradient. Then, after a predetermined time has elapsed since the (raveling state of the vehicle V has been switched to the gear-in coasting state, the vehicle control device 10 determines whether the vehicle V is decelerating. When determining that the vehicle V is decelerating, the vehicle control device 10 ends the gear-in coasting state.

Accordingly, since the increase in the speed of the vehicle V while traveling on the downhill road is lowered, the vehicle control device 10 can improve the fuel efficiency and improve the feeling of the driver as compared with a case of continuing the N coasting state without switching to the gear-in coasting suite. Further, the vehicle control device 10 can prevent the gear-in coasting state from being ended early within a predetermined time after the traveling state is switched to the gear-in coasting state so as not to give the sense of discomfort to the driver. Therefore, the vehicle V can further improve the feeling of the driver with respect to the traveling control.

Although the present invention has been described above using the embodiment, the technical scope of the present invention is not limited to the scope described in the above embodiment, and various modifications and changes are possible within the scope of the spirit thereof. For example, a specific embodiment of distributing and integrating devices is not limited to the above embodiment, and all or a pan thereof may be configured to be functionally or physically distributed or integrated in arbitrary units. Further, new embodiments generated by any combination of a plurality of embodiments are also contained in the embodiment of the present invention. Effects of the new embodiments generated from the combinations include effects of the original embodiment.

The present application is based on Japanese Patent Application (No. 2018-051094) filed on Mar. 19, 2018, contents of which are incorporated herein as reference.

INDUSTRIAL APPLICABILITY

The vehicle control device and live vehicle control method of the present disclosure are useful in that the feeling of the driver with respect to the traveling control can be improved.

REFERENCE SIGNS LIST 1 engine
2 transmission

3 GPS sensor
4 weight sensor
5 speed sensor
10 vehicle control device
11 storage unit
12 controller
121 road gradient specifying unit
122 balance gradient calculation unit
123 traveling control unit
V vehicle

The invention claimed is:

1. A vehicle control device comprising an electronic control unit configured to:
specify a road gradient of a section from a position of a vehicle to a position ahead by a predetermined distance from the position of the vehicle on a road on which the vehicle travels;
calculate a balance gradient that is a gradient at which a propulsive force of the vehicle and a resistance force applied to the vehicle are balanced when the vehicle travels in a gear-in coasting state in which an engine is connected to a gear and the vehicle travels without supplying fuel to the engine, the balance gradient being calculated in a case where a traveling state of the vehicle is a neutral coasting state that is a state of traveling without connecting the engine to the gear; and
switch, based on the calculated balance gradient and the specified road gradient, the traveling state of the vehicle from the neutral coasting state to the gear-in coasting state in a case where the traveling state of the vehicle is the neutral coasting state; determine whether an end condition of the gear-in coasting state is satisfied after a predetermined time has elapsed since the traveling state of the vehicle is switched to the gear-in coasting state; and end the gear-in coasting state when determining that the end condition is satisfied.

2. The vehicle control device according to claim 1, wherein the electronic control unit is configured to determine whether the vehicle is decelerating at a predetermined time interval in a case where the traveling state of the vehicle is the gear-in coasting state, and end the gear-in coasting state when determining that the vehicle is decelerating for a predetermined continuous number of times.

3. The vehicle control device according to claim 2, wherein the electronic control unit is configured to determine, based on the balance gradient and the road gradient, whether to switch the traveling state of the vehicle to the gear-in coasting state at a time interval shorter than the predetermined time interval in a case where the traveling state of the vehicle is the neutral coasting state, and switch the traveling state of the vehicle from the neutral coasting state to the gear-in coasting state when determining to switch the traveling state of the vehicle to the gear-in coasting state.

4. A vehicle control method which is executed by a computer, the vehicle control method comprising:
specifying a road gradient of a section from a position of a vehicle to a position ahead by a predetermined distance from the position of the vehicle on a road on which the vehicle travels;
calculating a balance gradient that is a gradient at which a propulsive force of the vehicle and a resistance force applied to the vehicle are balanced when the vehicle travels in a gear-in coasting state in which an engine is connected to a gear and the vehicle travels without supplying fuel to the engine, the balance gradient being calculated in a case where a traveling state of the vehicle is a neutral coasting state that is a state of traveling without connecting the engine to the gear; and
switching, based on the calculated balance gradient and the specified road gradient, the traveling state of the vehicle from the neutral coasting state to the gear-in coasting state in a case where the traveling state of the vehicle is the neutral coasting state; determining whether an end condition of the gear-in coasting state is satisfied after a predetermined time has elapsed since the traveling state of the vehicle is switched to the gear-in coasting state; and ending the gear-in coasting state when determining that the end condition is satisfied.

5. A vehicle control device comprising:
a road gradient specifying unit configured to specify a road gradient of a section from a position of a vehicle to a position ahead by a predetermined distance from the position of the vehicle on a road on which the vehicle travels;
a balance gradient calculation unit configured to calculate a balance gradient that is a gradient at which a propulsive force of the vehicle and a resistance force applied to the vehicle are balanced when the vehicle travels in a gear-in coasting state in which an engine is connected to a gear and the vehicle travels without supplying fuel to the engine, the balance gradient being calculated in a case where a traveling state of the vehicle is a neutral coasting state that is a state of traveling without connecting the engine to the gear; and
a traveling control unit configured to: switch, based on the calculated balance gradient and the specified road gradient, the traveling state of the vehicle from the neutral coasting state to the gear-in coasting state in a case where the traveling state of the vehicle is the neutral coasting state; determine whether an end condition of the gear-in coasting state is satisfied after a predetermined time has elapsed since the traveling state of the vehicle is switched to the gear-in coasting state; and end the gear-in coasting state when determining that the end condition is satisfied.

* * * * *